Patented Mar. 21, 1933

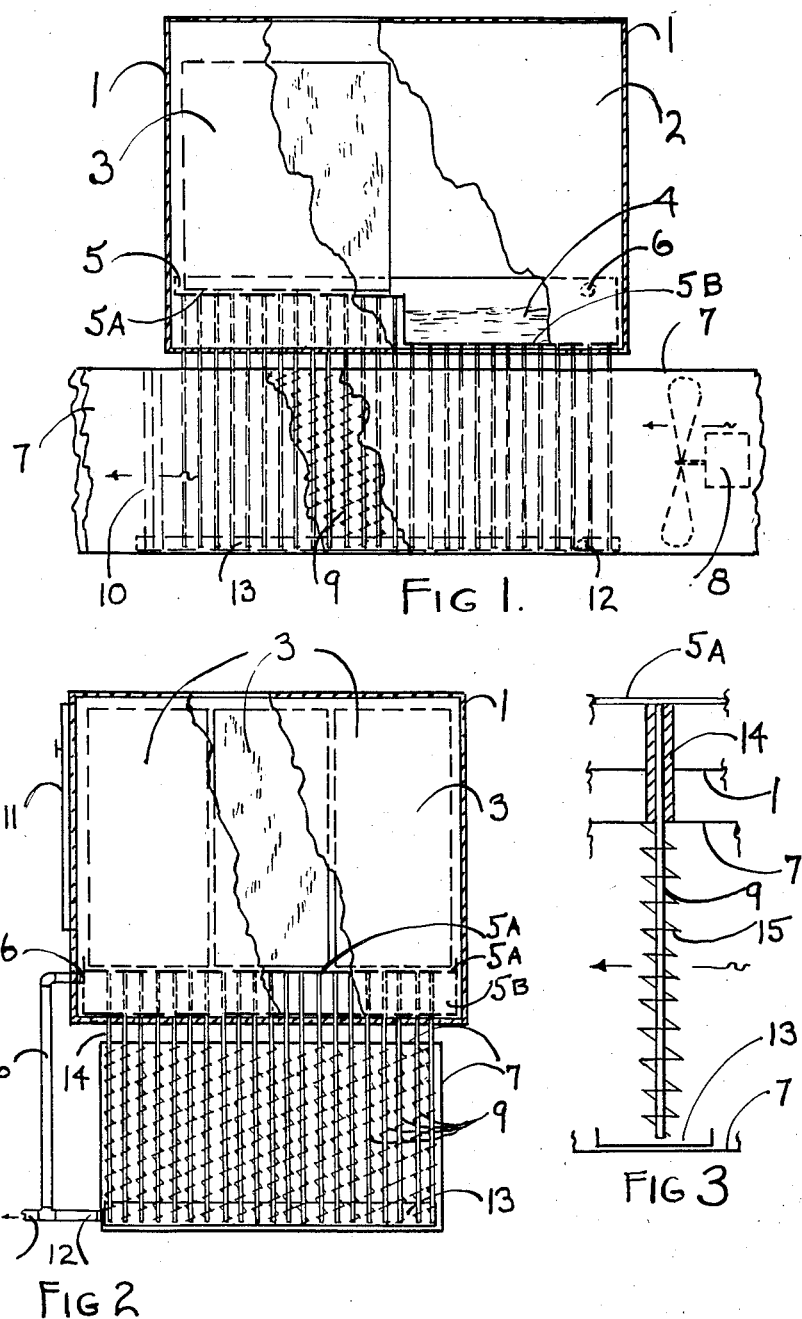

1,902,246

UNITED STATES PATENT OFFICE

FRANCIS A. KITCHEN, OF CLEVELAND, OHIO

AIR COOLING

Application filed March 2, 1931. Serial No. 519,474.

This invention relates to improvements in an air cooler, whereby air can be lowered in temperature by passing over an extended surface which is cooled by reason of conduction of heat through metal to a cooling medium. More particularly, the invention relates to a means of transferring heat from a space wherein air is forced to circulation, to a space adjacent thereto where is located a cooling medium in direct contact with the means of transferring the heat.

A further object of the invention is to provide a means of reducing the moisture content of the air by passing over an extended surface the temperature of which may be below the dew point of the air, thus condensing some of the moisture contained in the air without the necessity of using cold water sprays as has been the prevailing practice.

A further object of the invention is to provide a means of conducting heat to a cooling medium such as ice, and to provide an additional means of conducting heat to the cold water resulting from the melting of said ice.

A further object of the invention is the placing of a cooling surface conducting heat to cold water resulting from melting ice, in such a position that the air to be cooled comes into contact with said surface before contacting the cooling surface conducting heat to the ice or cooling medium, thus providing the most effective and efficient transfer of heat.

A further object of the invention is the placing of a cooling medium such as ice in a separate insulated compartment and to provide a means of transferring heat from another space through which air is being forced.

In the illustration of the invention, Fig. 1 shows a diagrammatic view of the air cooler, cut away to reveal the component parts of the device. An enclosure 1 provides a storage space 2 for the placing of a cooling medium such as ice 3. Within the storage space 2 is positioned a gathering pan 5 for the accumulation of water 4 resulting from the melting of ice 3. Gathering pan 5 provides a conducting surface from the ice 5a and from the cold water 5b. An outlet for overflow of water from gathering pan 5 is shown at 6. The enclosure 1 is shown positioned above air duct 7 or chamber connected to a means of moving air such as a fan and motor 8. Also within the duct 7 are placed conductor rods 9 around which are positioned extended surface fins. An eliminator 10 for removing any entrained moisture from the air is shown. A gathering pan 13 is shown positioned under conductor rods 9; also outlet 12 for the removal of moisture condensed out of the air.

Fig. 2 shows a sectional view of the cooler enclosure 1 with ice cakes 3 in contact with conductor surface 5a. Conductor rods 9 are shown connected to gathering pan 5 or conductor surface 5a. A door 11 for the charging of the ice 3 is shown.

The conductor rods 9 are shown extended into air duct 7 so that the air flow comes into contact with the entire cooling surface. Another view of gathering pan 13 shows the outlet 12 connected to water outlet 6 from ice enclosure 1.

Fig. 3 shows an enlarged view of the cold surface 5a upon which the cooling medium is in direct contact and the conductor rods 9 and extended surfaces 15 which are used for the transmission of heat by surface contact with the air stream. The rod 9 passes through enclosed wall 1 and air duct walls 7 and is covered between the two compartments by insulation 14. The enlarged view shows collecting water pan 13 placed below the conductor rod 9.

It is well known that certain metals such as copper will permit the transmission of heat at a fairly rapid rate from one side to the opposite side by what is called "conduction". The extent of this conduction is partially dependent upon the area of the metal used and upon the temperature difference between the hot and the cold surfaces.

It is also well known in the art of air conditioning that to secure a lower "effective" temperature which combines the temperature, the humidity content and the motion of air, it is necessary to control the humidity by means of dehumidifying. It is also evident that with a proper cold surface area, the air temperature will be reduced to its dew point where condensation of moisture in the air will take place. The result is most easily obtained without frosting if the cold surface can be maintained at a temperature slightly above freezing.

In the transmission of heat to an air stream to a metal surface, it is apparent that a proper proportion of extended surface must be provided in direct contact with the metal used for conduction. It is also necessary to have direct contact of the conductor surface with the cooling medium, and further, said conductor must be insulated where exposed to losses to the surrounding air.

In operation, the unit may be connected to an existing piping system connected to a room or series of rooms, or it may be used separately to cool the air from and to a single room.

In operation, the ice cakes 3 which may be used to charge the storage chamber 2 through door 11, rest on the copper surface 5a which by reason of being in direct contact with heat conductor rods 9 is at a higher temperature than the temperature of the ice 3. The ice is melted gradually, dissipating the heat from the air which passes over the conductor rods 9 connected to copper surface 5a. The resulting melted water 4 is still at a temperature above the air temperature, and is therefore collected in a pan 5 forming a similar conductor surface 5b which is also connected to conductor rods 9 which are positioned ahead of the conductors 9 transmitting heat directly to the ice cakes 3. Thus the cold melted ice water 4 is also utilized to dissipate heat from the air stream.

In the descriptive views, the air may be forced by a fan and motor 8 through a duct 7 over the conductors connected to 5b so that the air is partially lowered in temperature and is then passed over conductors connected to 5a which further lowers the temperature of the air. Under certain air conditions, the air thus cooled by contact with the conductor surfaces may condense some of its moisture content upon the cold surfaces. This condensation is allowed to drain off in the pan 13 provided for this purpose. An eliminator surface 10 may be provided to catch any moisture which may be carried in the air stream.

The invention thus discloses a new and simple device for the cooling, dehumidifying or conditioning of air, which provides a means of eliminating complicated and unwieldly equipment heretofore required to obtain the equivalent result.

It is not necessary to use ice as a cooling medium, as a similar cold substance or surface providing heat absorption could be used without affecting the operation of the unit.

It is shown that the disclosure provides a means of melting the ice gradually so as to give a constant cooling effect.

I claim as my invention:

1. An air conditioning device for cooling air and reducing its absolute humidity, comprising in combination a container having a stepped bottom, said step adapted to support a cake of ice within said container, the remainder of said bottom forming a recess for the reception of the water resulting from the melting of said cake of ice, an air duct positioned adjacent to said container, means for inducing a flow of air to be conditioned through said duct, and a plurality of heat exchanging elements extending into said duct, said elements connecting with said bottom in heat exchanging relationship and adapted to reduce the temperature of the air flowing through said duct below its dew point whereby condensation of the excess moisture present will be effected.

2. An air conditioning device according to claim 1 in which said duct is provided with a pan, a duct leading from said pool of ice water to said pan, a drain line for leading water from said pan, said heat exchanging elements extending into said pan, whereby an added cooling medium is provided for said heat exchanging elements.

FRANCIS A. KITCHEN.